March 13, 1945.  B. W. MANTLE  2,371,400
BEARING CONSTRUCTION
Original Filed May 25, 1942
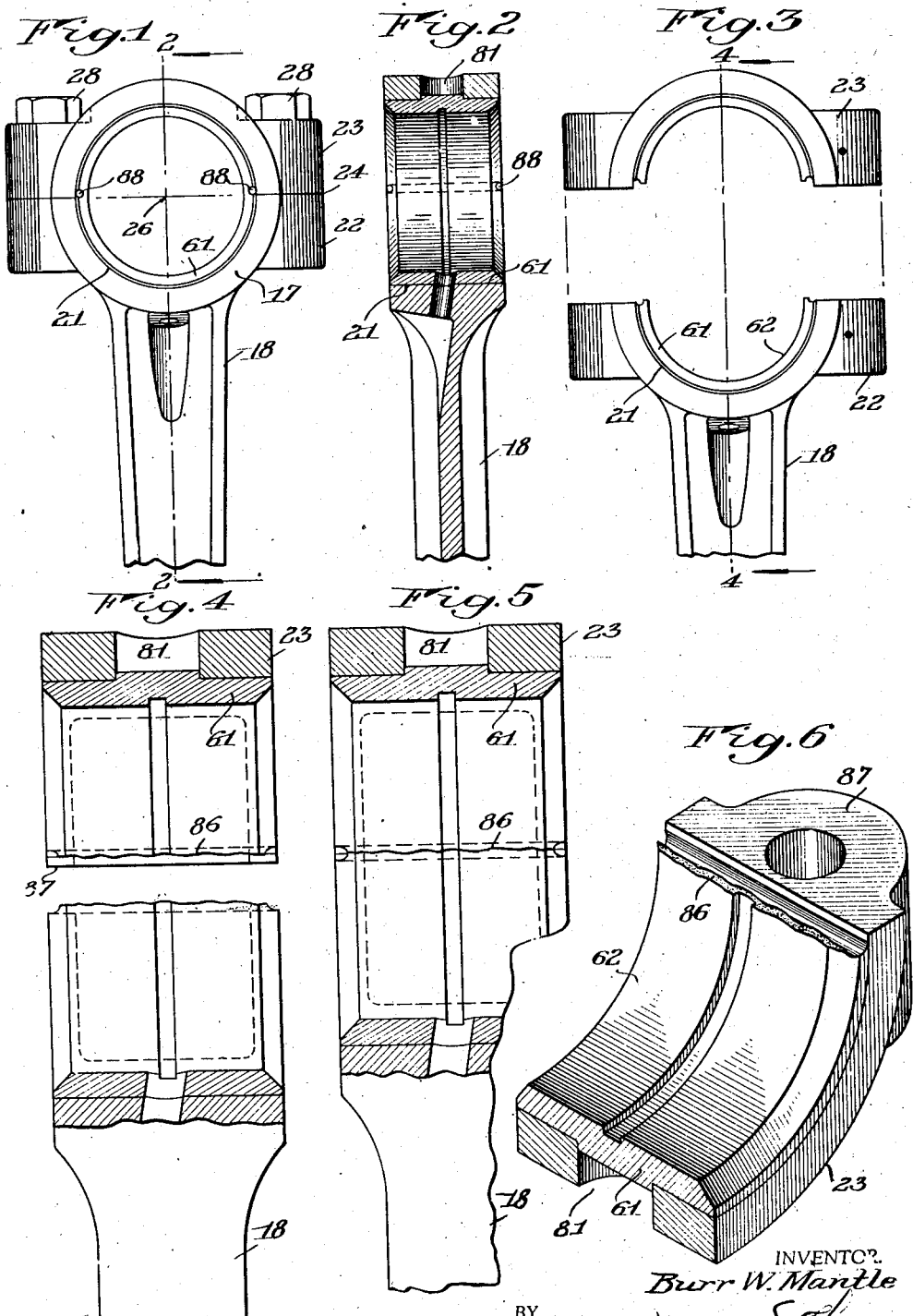
INVENTOR.
Burr W. Mantle
BY
his Attorney Patented Mar. 13, 1945

2,371,400

UNITED STATES PATENT OFFICE 2,371,400

BEARING CONSTRUCTION

Burr W. Mantle, Pittsford, N. Y., assignor to American Brake Shoe Company, a corporation of Delaware Original application May 25, 1942, Serial No. 444,372. Divided and this application March 29, 1943, Serial No. 481,038

2 Claims. (Cl. 308—237)

My invention relates to a bearing construction. Reference is made to my copending application, Serial No. 444,372, filed May 25, 1942, of which this application is a division. While the principles of my invention will be described in connection with the making of a bearing for a connecting rod, the invention or at least most of the features thereof, has wider application and may be employed in making bearings generally, and particularly in making those bearings which must be made in two parts for the purpose of enabling the bearing to be encircled about a shaft or other cooperating element.

In providing a two part bearing for a machine element, such as the bearing located at the crank end of a connecting rod, a number of methods of manufacture are in common use. Some manufacturers prefer to provide the bearing cavity with separate preformed bearing shells lined, for example, with Babbitt metal. Others prefer to cast or spin the bearing metal into the bore of the connecting rod.

One conventional method of babbitting the crank end of a connecting rod is to separate babbitt the bearing cavity of the rod proper and the bearing cavity of the cap. The surfaces are then scraped or cleaned. After the rod and cap are bolted together the necessary machine work may be done. This method has the advantage that it is unnecessary to cut the babbitt at the rod and cap intersection since these parts are separately cast. However, this advantage is accompanied by the disadvantage, among other things, that two casting operations are required.

In other known methods of babbitting the complete annular bearing is formed in one operation. This is accomplished either by spinning the babbitt into the bearing cavity while rotating the rod at a suitable speed, or by providing the rod with a fixture, part of which constitutes a mold and pouring the Babbitt metal into the mold thus formed. While the bearing may be split by employing a shim or partition either when the bearing is spun or cast, frequently the rod and the cap portions of the bearing are divided by sawing the bearing after the bearing metal has solidified. Cutting the babbitt at the intersection of the cap and rod not only requires additional and costly machining operations, but also results in breaks in the continuity of the bearing surface along the lines of sawing. This causes breaks in the oil film on the bearing, thereby reducing the allowable bearing pressure on the rod.

All of the above methods are objectionable for one reason or another. Most of them require considerable and costly machining of the parts and result in a bearing surface which is not smooth, continuous and unbroken throughout its annular extent. Moreover, some of the above mentioned methods necessitate excessive handling of the parts, particularly due to the fact that the cap and the rod must be separated and reassembled several times during the process of manufacture.

An object of my invention is to provide a bearing construction which, when it becomes worn, may be readily adjusted and taken up and in which provision is made for enabling a cold flow of the bearing metal during the application of pressure on the bearing as the bearing is being taken up.

Other objects and advantages of my invention will be set forth in the appended claims and will clearly appear from the following description, when taken in connection with the accompanying drawing, in which:

Fig. 1 is a plan view of the crank end of a connecting rod employing the bearing of and made by the method of my invention, showing the parts as they appear prior to breaking the bearing;

Fig. 2 is a view taken substantially on the line 2—2 of Fig. 1, also showing the crank end of the connecting rod prior to breaking the bearing;

Fig. 3 is a view similar to Fig. 1 with the bolts between the cap and the rod removed, with the bearing broken and the cap and rod separated;

Fig. 4 is a view taken substantially on the line 4—4 of Fig. 3;

Fig. 5 is a view similar to Fig. 4 showing the cap reassembled with respect to the rod and with the line of bearing break somewhat exaggerated for the purpose of illustration;

Fig. 6 is a perspective view showing a part of the cap of the connecting rod.

The principles of my invention are applicable to bearings generally and particularly to that type of bearing which is made in two separable parts for the purpose of enabling the bearing to be encircled about a shaft, crank or other cooperating member. For purposes of illustration, and not by way of limitation, the invention is described herein in connection with the manufacture of a bearing for the crank end of a connecting rod. The connecting rod or pitman, as shown in the drawing, comprises a wrist pin end 16 (Fig. 7) and a crank end or head 17 which are joined by a connecting piece or shank 18. The wrist pin end of the connecting rod is provided with a bore 19 while the head is provided with a bore 21. The connecting rod parts may be integral of cast iron or any other suitable material, the material depending upon the service to which the connecting rod is to be put. The particular connecting rod illustrated in the drawing is a forging but this fact is, of course, immaterial to the invention.

The connecting rod head comprises two major parts, a rod proper part 22 and a cap part 23. In the preferred practice the rod, after bolt openings are bored as shown, is saw cut along a plane 24 which preferably extends through the axis 26 of the bore 21. This enables the parts to be encircled about a shaft where it is not feasible to slip the connecting rod endwise onto the shaft. The rod part 22 is threaded, as shown at 27, for the reception of bolts 28 employed for the purpose of rigidly clamping the cap with respect to the connecting rod proper.

After the above mentioned operations have been completed the cap and rod are bolted together preparator to pouring the crank end bearing. One of the purposes of my invention is to avoid the necessity, during the making of the bearing and the machining of the parts, of removing the bolts 28 and taking the connecting rod head apart. With my method the parts do not have to be separated except when the connecting rod is to be assembled with respect to its cooperating shaft. This results in an appreciable saving in production time. The bore 21, prior to pouring the bearing metal, is preferably tinned to enable the bearing metal to more readily bond with the metal of the connecting rod. While tinning is not entirely necessary with a forging, it is the usual practice to use some material which will serve to provide a better bond for the bearing metal. Any suitable bearing metal may be used but I prefer to use the conventional bearing metal alloy known as Babbitt metal.

For the purpose of carrying out the novel method of my invention, I have developed a novel babbitting fixture, the details of which are shown and described in my above mentioned copending application. While other babbitting fixtures might be employed, I have found the particular fixture to be extremely convenient to use and particularly adapted to high speed production.

After removal from the babbitting fixture the rod is placed in a high speed boring machine and both bearings accurately bored in one clamping of the rod, the taper of the crank bearing being removed in this boring operation. The rod, after inspection, is then ready for assembly on the machine with which it is to be used.

In the assembly of the connecting rod with respect to its shaft or crank it is for the first time necessary to remove the cap from the rod. This is an important advantage in my method of babbitting for the reason that considerable time, in most of the conventional methods of babbitting, is lost due to the fact that the cap must be removed and reassembled with respect to the connecting rod several times during the course of manufacture. After the removal of the bolts the cap is broken off the rod, either by a sudden jar or by holding the cap in a vise and pushing sidewardly on the rod. Breaking of the bearing is facilitated due to the fact that my method of bearing production leaves openings 88 in the body of the bearing. These openings weaken the bearing in a plane substantially passing through the centers of these openings. This plane lies substantially parallel to the line of separation of the cap and connecting rod proper but is, in the preferred form of the invention, slightly out of coincidence therewith for a purpose which will later appear.

The babbitt breaks off to form jagged edges across both sides of the bearing, as illustrated at 86 in Figs. 4, 5, and 6. These jagged edges are precisely complementary to each other so that when the bearing parts are fitted together a perfect contact is made and only an almost invisible line of break exists. In the drawing for purposes of illustration, I have exaggerated the lines of break. However, when the parts are placed together the bearing surface is smooth and for all practical purposes unbroken. Since substantially perfect contact between the broken parts of the bearing is made, the oil film on the bearing is in no way broken and the allowable bearing pressure is substantially that which would be permitted with a solid bearing.

One important feature of my invention lies in the fact that the jagged edges 86 (Fig. 6) lie below the machined surfaces 87 of the cap due to the fact that the plane of the openings 88 formed by the pins 52 is out of coincidence with the plane of separation of the cap from the rod proper. While the openings 88 might be placed on the rod proper side of the plane of separation, I have located the openings 88 as shown so as to enable the bearing to be more readily taken up in service. Thus in service should the bearing become worn, the cap may be removed, placed in a vise and the surfaces 87 filed without removing the connecting rod. Since the jagged edges 86 lie below the surfaces 87, the filing of the surfaces 87 in no way affects the bearing.

After the two surfaces 87 have been filed and the bearing is reassembled about its crank shaft, the application of pressure on the screws or bolts 28 causes a pressure on the bearing. Since the Babbitt metal is softer than the metal of the associated shaft, the bearing surface will conform itself to the shaft. Whatever excess bearing metal exists, as a result of filing the surfaces 87, will tend to cold flow into the openings 88 in the bearing body. Thus the precise complementary mating of the jagged edges, produced when the bearing is broken, may be preserved even should adjustment of the bearing in service be required.

While I have described my invention as being produced by casting the bearing, it would be possible to use the same general principles of my invention and spin the babbitt into the bore of the connecting rod. Moreover, while I have shown and described the openings 88 in the bearing body as being produced during the casting of the bearing, it will be appreciated that if desired these openings can be bored after the bearing metal has solidified. While this procedure would enable the accomplishment of the general principles of my invention, it would be more costly since additional machine operations would be required.

I have shown and described the openings as extending completely through the bearing. This is, of course, not essential. All that is required is that the bearing be sufficiently weakened to permit fracture, as described above. This could be accomplished by extending the openings only part way through the bearing.

While I have shown and described the novel bearing construction of my invention it will be appreciated that various changes and modifications may be made therein, particularly in the form and relation of parts, without departing from the spirit of my invention as set forth in the appended claims.

I claim:

1. A construction for a machine part wherein the part has a bore and has a plane of separation dividing the part into two approximate half cylinders which are normally secured together, an annular bearing for said part comprising a bearing body and a bearing surface, said bearing having a pair of openings which extend through the bearing body without breaking the bearing surface, said openings being located approximately on opposite sides of the bearing, said bearing being broken approximately along the plane of said openings to provide two accurately mating bearing sections with each of the sections being secured to one of said cylinders, the plane of said break being slightly out of coincidence with the plane of separation.

2. A construction for a machine element wherein the element has an opening and the walls of the opening have two partings forming a plane separating the element into two parts which are normally secured together, a bearing for said element bonded with the walls of said opening, said bearing having a body and an annular bearing surface, and having two partings adjacent the partings in the walls of the opening, and the bearing body having at least one opening offset with respect to said plane which extends through the bearing body in such manner that the bearing metal may cold flow into the opening when the bearing is adjusted for wear.

BURR W. MANTLE.